United States Patent [19]
Serafin

[11] Patent Number: 5,158,405
[45] Date of Patent: Oct. 27, 1992

[54] DEBURRING TOOL AND METHOD

[76] Inventor: John Serafin, 1813 Enterprise St., Waukesha, Wis. 53186

[21] Appl. No.: 708,475

[22] Filed: May 31, 1991

[51] Int. Cl.⁵ .................... B23B 35/00; B23B 51/00
[52] U.S. Cl. ..................... 408/1 R; 51/328; 51/403; 407/8; 408/145; 408/199
[58] Field of Search ............ 408/1 R, 144, 145, 199, 408/210, 227; 407/8; 51/394, 403, 407, 281 P, 328

[56] References Cited

U.S. PATENT DOCUMENTS

| | | | |
|---|---|---|---|
| 2,309,456 | 1/1943 | Hoskin et al. | 51/403 |
| 2,450,075 | 9/1948 | Bashara | 408/227 |
| 2,732,612 | 1/1956 | Hallock | 408/227 |
| 3,276,294 | 10/1966 | Kubicek | 408/199 |
| 4,679,971 | 7/1987 | Maier | 408/145 |

FOREIGN PATENT DOCUMENTS

| | | | |
|---|---|---|---|
| 2156846 | 5/1973 | Fed. Rep. of Germany | 408/156 |
| 638453 | 12/1978 | U.S.S.R. | 407/8 |

OTHER PUBLICATIONS

*Modern Machine Shop,* Oct. 1977, Single Stroke Honing to Size . . . In Seconds!.
*Express Line* by Abrasive Technology, Inc., Copyright Notice 1988.
*Kadia Diamond Deburring Tools,* Undated.

*Primary Examiner*—Daniel W. Howell
*Attorney, Agent, or Firm*—Andrus, Sceales, Starke & Sawall

[57] ABSTRACT

A deburring tool is constructed of a pair of wire sections resiliently interconnected with each other so that each biases the other against the internal side walls of a bore formed in a workpiece. Abrasive material is provided on either or both of the sections, and rotation of the tool about its longitudinal axis causes engagement of the abrasive material with the area of the bore wall at which burrs are to be removed. The tool can be formed of a single length of wire having a curved portion on which the abrasive material is located, or the tool can assume various other configurations. The single wire version can be used to remove burrs from the interior of very small bores.

17 Claims, 4 Drawing Sheets

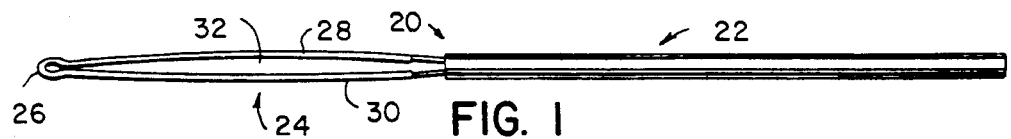
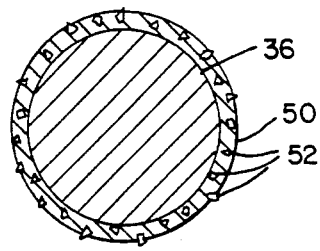
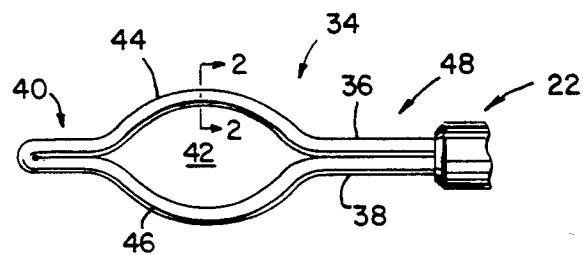
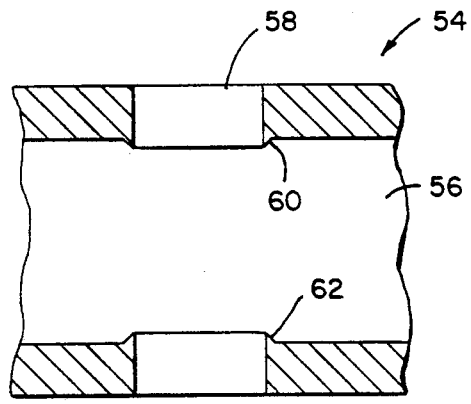
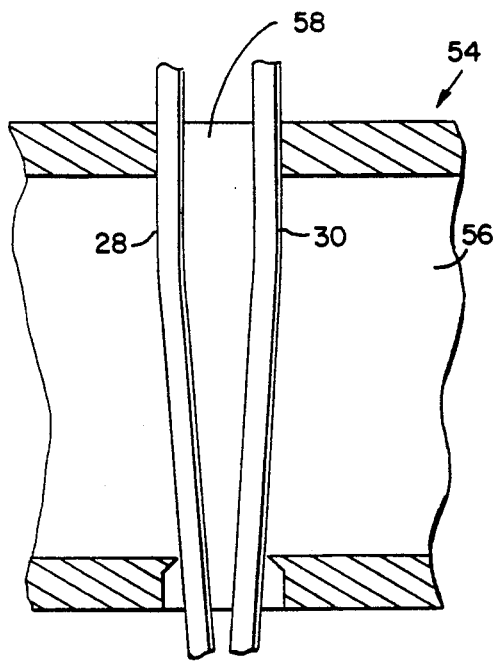
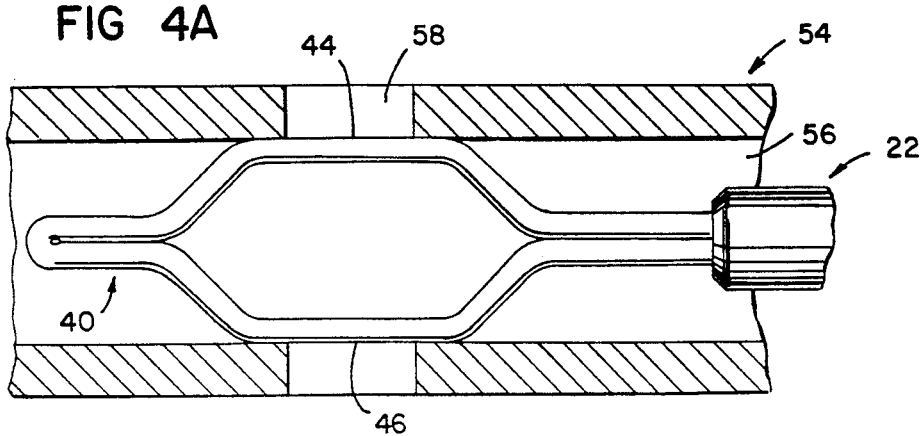

DEBURRING TOOL AND METHOD

BACKGROUND AND SUMMARY

This invention relates broadly to tools, and more particularly to deburring tools for removing burrs from internal and external surfaces associated with a workpiece.

Burrs are a common problem in machining metal and plastic parts, and are generally formed when a rotating element associated with a machine, e.g. a drill bit, is forced through the part and emerges from the material into an internal cavity or onto an external surface. It is generally desirable to remove burrs from the workpiece. In some applications, however, it is critical that the burrs be removed from the part before the part is incorporated into an assembly. One such application is hydraulic valving. In a hydraulic system, if a burr is not removed from a part before it is incorporated into a valve, it is possible for the burr to break off during operation due to the high fluid pressures and flow within a hydraulic system. The burr can cause significant damage to the hydraulic pump, hoses, valves or associated components.

In addition, another commonly recognized deburring problem involves removing burrs from small holes formed in a part.

It has been known to provide deburring tools which consist of a shank adapted to be received within a rotatable chuck. The deburring tool includes a tip adapted to be inserted into a bore, and abrasive material is provided on the tip. Such tools are available throughout a range of sizes, for use in connection with varying sizes of bores. While deburring tools of this type function satisfactorily, such tools are disadvantageous in that each tool can only be employed for removing burrs within an opening having a diameter corresponding to that of the tool. In addition, such tools have a tendency to roll the burr over rather than remove the burr. Further, deburring tools of this type cannot be satisfactorily made to remove burrs from within small diameter openings.

Accordingly, it is an object of the present invention to provide a deburring tool and method which is suitable for use in removing burrs from within small diameter openings. It is a further object of the invention to provide a single deburring tool which can be used to remove burrs from within bores of varying sizes over a predetermined range, thus reducing the total number of deburring tools needed to remove burrs from within bores having a wide range of sizes. Further, it is an object of the invention to provide a tool which cuts burrs, rather than rolling them over.

In accordance with one aspect of the invention, a tool for removing burrs or other material associated with a circular bore in a workpiece, which is defined by a circular internal side wall, is formed from a first portion which engages the side wall of the bore at a first location, and a second portion which engages the side wall of the bore at a second location, spaced radially from the first location. Abrasive material is provided on at least the second portion of the tool for removing burrs from the bore upon rotation of the tool. The first and second portions of the tool are resiliently interconnected with each other such that engagement of the first portion with the bore side wall at the first location biases the second portion against the bore side wall at the second location. The first and second portions of the tool are preferably formed integrally with each other, and are constructed of a length of wire. In one form of the invention, the first portion of the tool extends along a longitudinal axis oriented parallel to that of the bore when the tool is inserted into the bore. The second portion of the tool is defined by a portion of the length of wire deformed from the longitudinal axis of the first portion. The second portion of the tool can assume varying forms, e.g. a single arcuate section formed in the wire or a double arcuate section in which each section is bent away from the longitudinal axis of the first section to define an elongated oval shape. The abrasive material may take the form of an abrasive coating provided at least on the second portion of the tool, and in some forms of the invention on both the first and second portions of the tool.

With the tool construction as summarized above, burrs can be removed from the internal wall of a bore by inserting the tool within the bore, and rotating the tool about a longitudinal axis parallel to that of the bore, with the abrasive material acting on the burr to dislodge it from the bore side wall. In a form of the invention in which an arcuate section is formed in a single strand of wire, with abrasive material provided on the arcuate section, the tool can be inserted into bores having very small diameters, while nonetheless effectively removing burrs from the internal side wall of the bore.

The resilient interconnection of the first and second portions of the tool allow the tool to be inserted into bores of varying diameters, while providing engagement of the bore side wall by the burr-removing portion of the tool with a force sufficient to remove burrs therefrom upon rotation of the tool.

The invention further contemplates a method of removing burrs from within a bore, substantially in accordance with the foregoing summary.

Various other features, objects and advantages of the invention will be made apparent upon consideration of the following description taken together with the drawings.

BRIEF DESCRIPTION OF THE DRAWINGS

The drawings illustrate the best mode presently contemplated of carrying out the invention.

In the drawings:

FIG. 1 is a side elevation view of one embodiment of a deburring tool constructed according to the invention;

FIG. 2 is a partial section view, reference being made to line 2—2 of FIG. 3;

FIG. 3 is a partial side elevation view of another embodiment of the deburring tool constructed according to the invention;

FIG. 4 is a partial section view through a workpiece showing a bore within which burrs are to be removed;

FIG. 4a is a view similar to FIG. 4, showing the deburring tool of FIG. 3 in position for removing burrs from within the bore;

FIG. 5 is a partial section view showing a portion of the deburring tool of FIG. 1 in position within a crossbore formed in a workpiece for removing burrs therefrom;

DETAILED DESCRIPTION OF THE INVENTION

Figure 6:
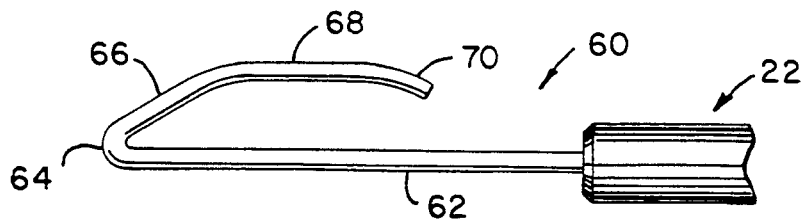
FIGS. 6-14 are partial elevation views showing other embodiments of the deburring tool of the invention.

Referring to FIG. 1, a deburring tool 20 constructed according to one form of the invention comprises a handle 22 and a deburring wire structure, shown generally at 24. Deburring wire structure 24 consists of a length of wire bent onto itself to form a distal loop 26 at its outer end, with the ends of the length of wire being received within the interior of handle 22. The length of wire bent onto itself defines a pair of legs 28, 30 which diverge away from each other inwardly of loop 26 and outwardly of the end of handle 22, defining a roughly elliptical space 32 therebetween.

FIG. 3 illustrates another embodiment of the invention, in which a wire structure 34 is connected to handle 22, and again consists of a length of wire bent onto itself to form a pair of legs 36, 38. In this form of the invention, the outer ends of legs 36, 38 are in engagement with each other at an end portion 40, with legs 36, 38 being bent away from each other at outwardly curved arcuate sections 44, 46 to define an internal roughly elliptical space 42 therebetween. The portions of legs 36, 38 lying between handle 22 and outwardly curved arcuate sections 44, 46 comprise a connector section, shown generally at 48.

FIG. 2 shows arcuate section 44 of leg 36 in cross-section. As shown in this figure, a coating 50 is provided on the surface of leg 36, with abrasive particles 52 being incorporated into coating 50. Coating 50 may take the form of an electroplated diamond abrasive material deposited on leg 36, or a carbon boron nitride coating, providing a grit size to abrasive particles 52 ranging from 40 to 600 grit. It is understood that any other satisfactory abrasive coating could be employed, in any satisfactory grit size. It has been found that grit sizes in the range of 140 to 400 function satisfactorily for most applications. The optimum grit size for an application depends on the size of burr to be removed, and the material of the workpiece.

Coating 50, which includes abrasive particles 52, provides an abrasive surface to legs 36 and wire 38 of wire structure 34 arcuate sections 44 and 46. Similarly, legs 28 and 30 of wire structure 24 shown in FIG. 1 are provided with an abrasive coating as shown and described in FIG. 2.

FIG. 4 illustrates a typical workpiece 54 having a longitudinal bore 56 and a cross-bore 58, which intersects bore 56. Burrs, shown at 60 and 62, are formed at the intersection of bores 56 and 58. To remove burrs 60 and 62 from within bore 56, a deburring tool such as shown in FIG. 3 is utilized. The operator grasps handle 22 and inserts wire structure 34 of the deburring tool into the longitudinal bore 56, which causes arcuate sections 44 and 46 of wire structure 34 to deform from their normal shape as shown in FIG. 3 and to attain the configuration as shown in FIG. 4a. In this position, arcuate sections 44, 46 flatten against and firmly engage the internal cylindrical wall of bore 56. Arcuate section 46 biases section 44 against the wall of bore 56 at one location, while arcuate section 44 biases arcuate section 46 against the wall of bore 56 at another location. After insertion of the tool to the position shown in FIG. 4a, the operator rotates handle 22 about its longitudinal axis, thereby resulting in rotating movement of wire structure 34 within bore 56 and engagement of burrs 60, 62 by the abrasive material provided on arcuate sections 44, 46. The abrasive material acts to remove burrs 60, 62 from within bore 56. The operator then removes the deburring tool from longitudinal bore 56, and utilizes a tool such as shown in FIG. 1 to remove burrs from cross-bore 58, as shown in FIG. 5. This is accomplished by inserting loop 26 at the outer end of wire structure 24 through cross-bore 58 until legs 28 and 30 are engaged with the walls of cross-bore 58. Again, handle 22 is rotated about its longitudinal axis, clockwise or counter-clockwise to cause engagement of the abrasive material provided on legs 28, 30 with burrs located within cross-bore 58, resulting in removal of such burrs therefrom.

After removal of burrs from bores 56 and 58, the bores may be brushed and honed in accordance with known techniques, if desired.

FIG. 6 illustrates an embodiment of the invention in which a wire structure 60 connected to handle 22 consists of an axial section 62 bent at an outer end 64 to an angled section 66, which connects to a straight section 68 and a tail section 70. In this arrangement, abrasive material is provided on straight section 68. When wire structure 60 is inserted into a bore, axial section 62 bears against the wall of the bore at one location, biasing straight section 68 against the wall of the bore at another location due to the resilient interconnection of sections 62 and 68. Rotation of handle 22 about its longitudinal axis moves section 68 around the internal surface of the bore, to remove any burrs which may be present.

Figure 7:
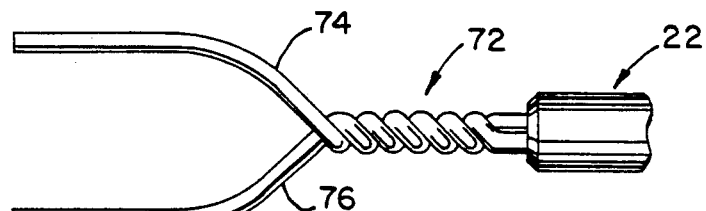

FIG. 7 illustrates an embodiment of the invention in which a connector section 72 consists of a pair of wires connected at one end to handle 22 and twisted together. At the outer end of connector section 72, the wires diverge to form a U-shape. One of the diverging wires is shown at 74, and the other at 76. Abrasive material is provided on the straight parallel portions of wires 74 and 76. The wire structure shown in FIG. 7 is inserted into a bore by drawing handle 22 and connector section 72 through the bore, resulting in engagement of wire sections 74 and 76 with the internal walls of the bore. Rotation of handle 22 about its longitudinal axis again results in burr removal by operation of the abrasive material on the parallel portions of wires 74 and 76.

Figure 8:
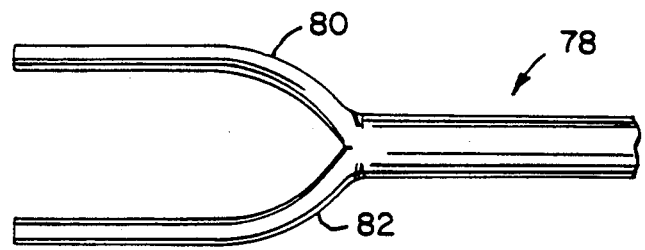

FIG. 8 illustrates an embodiment similar to that shown in FIG. 7, but in which the connector section consists of a trunk portion 78 with a pair of branches 80, 82 emanating therefrom to form a U-shape. As with the embodiment of FIG. 7, abrasive material is provided on the straight parallel portions of branches 80, 82, resulting in removal of burrs upon rotation of trunk 78 about its longitudinal axis.

Figure 9:
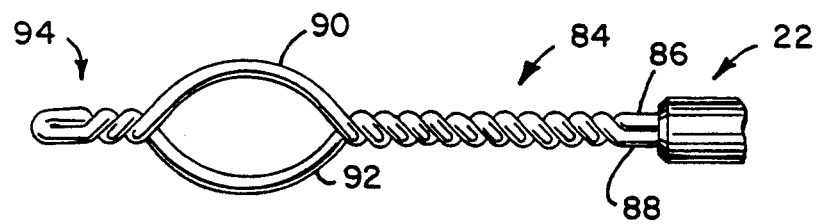

FIG. 9 illustrates an embodiment somewhat similar to that shown in FIG. 3, but in which a connector section 84 extending outwardly from handle 22 consists of the adjacent portions of a pair of legs 86, 88 being twisted together. Oppositely curved arcuate sections 90, 92 diverge away from each other at the outer end of connector section 84, forming a roughly oval shape, and converge together at an end portion 94. At end portion 94, the adjacent legs are again twisted together. In the embodiment of FIG. 9, abrasive material is provided on arcuate sections 90, 92, acting to remove burrs from the internal wall of a bore upon rotation of handle 22 about its longitudinal axis. As with the other embodiments of the invention, oppositely curved sections 90, 92 resiliently bias each other against the internal wall of the bore, to insure firm contact of each with the bore walls and to accommodate insertion into varying bore sizes.

Figure 10:
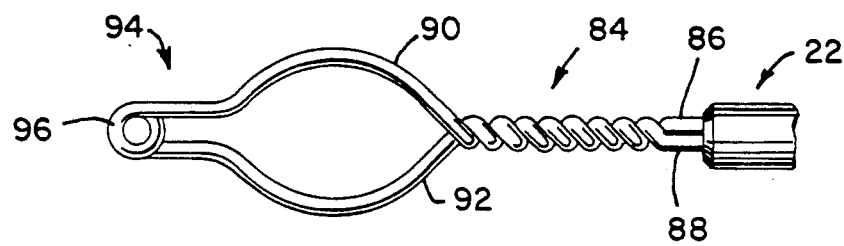

The embodiment of FIG. 10 is substantially similar to that shown in FIG. 9, but in this embodiment a loop 96 is provided at the outer end portion 94, with the portions of the wire between loop 96 and arcuate sections 90, 92 being spaced from each other. This arrangement provides a greater degree of flexibility of curved portions 90, 92 in fitting into bores of varying sizes, and loop 96 provides a spring-like effect to maintain the outer portions of curved sections 90, 92 in engagement with the bore walls.

Figure 11:
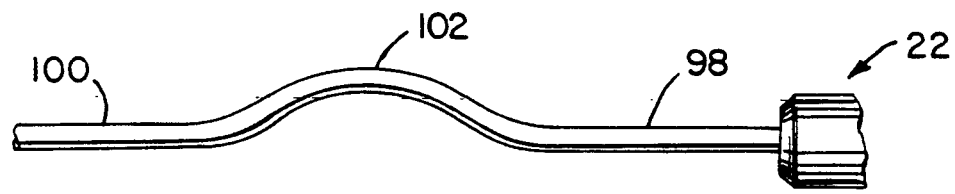

FIG. 11 illustrates the invention in its simplest form, consisting of a single length of wire, e.g. piano wire, extending outwardly from handle 22. The wire consists of a straight inner section 98 connected to handle 22, a straight outer section 100 lying along the longitudinal axis of inner section 98, and a curved section 102 interconnecting inner and outer straight sections 98, 100. In this embodiment, abrasive material is provided on curved section 102. When outer straight section 100 or inner straight section 98, or both, are located against the internal side wall of a bore at one location, curved section 102 is biased against the bore wall at a location spaced radially therefrom, thus causing engagement of the outer portion of curved section 102 with the bore wall. Rotation of handle 22 about its longitudinal axis moves the abrasive material on curved section 102 around the internal side wall of the bore, to remove burrs. By employing a fine gauge wire along with a relatively small amount of curvature to curved section 102, the embodiment as shown in FIG. 11 can be employed to remove burrs from the internal side walls of bores having extremely small diameters, such as down to approximately 0.015 inches.

Figure 12:
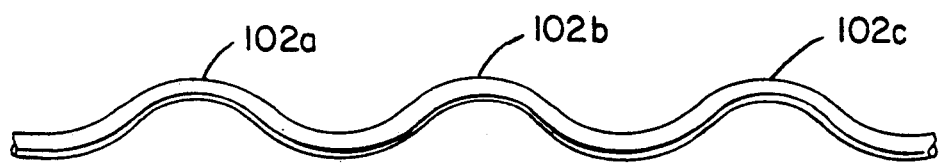

The embodiment shown in FIG. 12 is similar to that shown in FIG. 11, but incorporates a series of undulating curved sections 102a, 102b and 102c, similar in function and construction to curved section 102 shown and described in FIG. 11. The embodiment of FIG. 12 is satisfactory for removing burrs along the length of a small diameter bore having a relatively long length.

Figure 13:
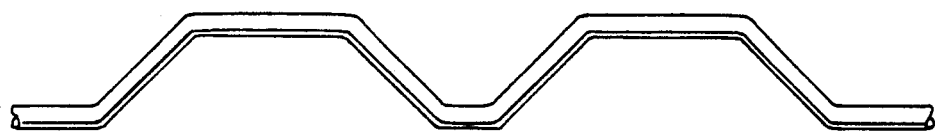

FIG. 13 shows an arrangement somewhat similar to that of FIG. 12, but in which the undulating curved sections are replaced with straight-sided sections.

Figure 14:
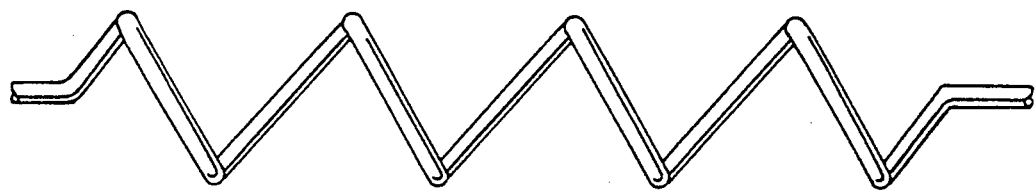

FIG. 14 shows a spiral type arrangement in which abrasive material is provided on the outer edges of the length of wire throughout its length, to maintain constant engagement with the internal walls of the bore.

Figure 15:
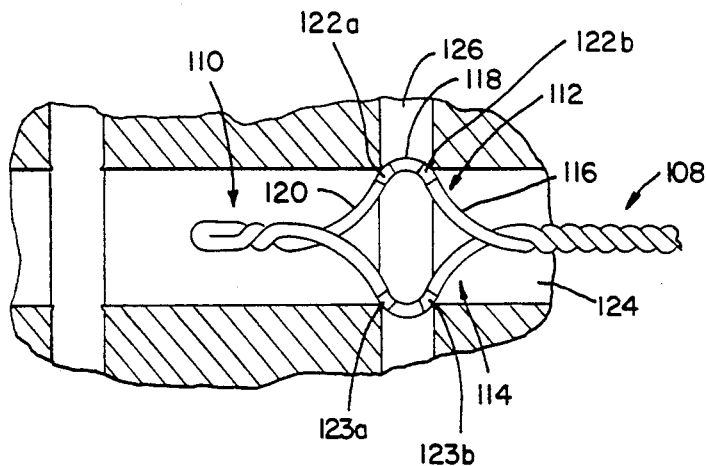
FIG. 15 is a partial elevation view of another embodiment of the deburring tool of the invention, shown in position within a bore formed in a workpiece.

FIG. 15 shows an embodiment of the invention in which side-by-side portions of the length of wire are twisted together to form a connector section 108 and an end portion 110. Between sections 108 and 110 lie a pair of oppositely curved sections 112, 114, which are substantially symmetrical about a longitudinal axis. Section 112 consists of a convex curved portion 116, an outer concave curved portion 118, and a convex curved portion 120 interconnected with end section 110. Abrasive material is provided on outer convex curved portion 118 at locations 122a and 122b. Curved section 114 is constructed similarly to curved section 112, having abrasive material at locations 123a and 123b. With this arrangement, providing abrasive material at only selected locations, burrs can be removed from the intersection of a longitudinal bore 124 and a groove 126 in a workpiece by the abrasive material at locations 122a, 122b and 123a, 123b upon rotation of the tool about its longitudinal axis. The resilient interconnection of curved sections 112, 114 urge the outer concave portions of each into the cross-bore 126, and thereby engagement of the abrasive material with the shoulder formed at the intersection of bores 124, 126. During insertion and removal of the tool into and out of bore 124, however, the lack of abrasive on the outermost area of the concave curved portions of sections 112, 114 prevents engagement of the abrasive material with the bore walls.

Figure 16:
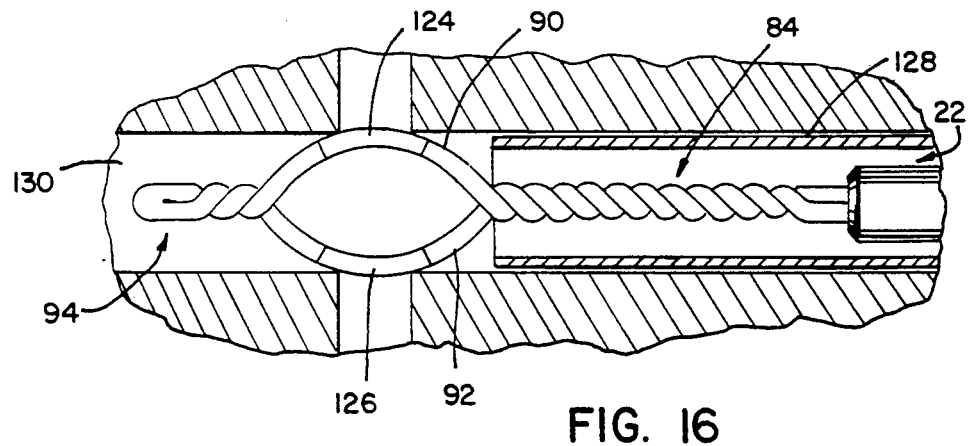
FIG. 16 is a partial elevation view of another embodiment of the deburring tool of the invention, shown in position within a bore formed in a workpiece in combination with a sleeve for protecting the side walls of the bore.

FIG. 16 illustrates another embodiment of the invention to accomplish this same end. In this embodiment, the deburring tool is constructed as shown in FIG. 9, but abrasive material is provided only at locations 124, 126 of arcuate sections 90, 92. A sleeve 128 is adapted to be inserted into the bore, shown at 130, from which burrs are to be removed, in order to protect the bore side walls from the abrasive material during insertion and removal of the tool to and from the bore. The resiliency of arcuate sections 90, 92 allow contraction to fit within sleeve 128 and provide expansion to engage the walls of bore 130.

Figure 17:
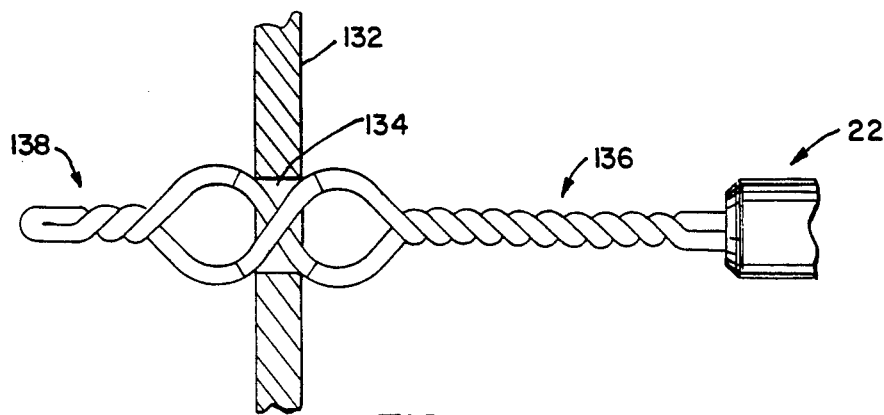
FIG. 17 is a partial elevation view of yet another embodiment of the deburring tool constructed according to the invention, for removing burrs from opposite surfaces of a workpiece.

FIG. 17 illustrates an embodiment adapted to remove burrs from opposite surfaces of a workpiece 132 at bore 134 formed therein. In this form of the invention, a connector section 136 is constructed of adjacent portions of a wire twisted together, as is an end section 138. Between connector section 136 and end section 138, a "FIG. 8" configuration is provided to the two legs of the wire from which the tool is formed. Abrasive material is provided at the x-shape formed by the intersecting portions of the "FIG. 8" shape, so as to engage the shoulders of workpiece 132 at the intersection of bore 134 with each surface of workpiece 132. Rotating handle assembly 22 results in removal of burrs from each surface. In addition, the internal side walls of bore 134 are prevented from contact by the abrasive material during insertion or removal of the deburring tool by the selective placement of the abrasive material on the wire sections.

Various alternatives and embodiments are contemplated as being within the scope of the following claims particularly pointing out and distinctly claiming the subject matter which is regarded as the invention.

I claim:

1. A tool for removing burrs associated with a bore in workpiece, the bore being defined by a circular internal sidewall, comprising:

a first portion for engaging the sidewall of the bore at a first location;

a second portion for engaging the sidewall of the bore at a second location where burrs are to be removed, spaced radially from said first location; and an abrasive provided on the second portion for removing burrs from the bore upon rotation of the tool;

wherein the first and second portions are resiliently interconnected with each other such that engagement of the first portion with the sidewall of the bore at said first location biases the second portion against the sidewall of the bore at said second location.

2. The tool of claim 1, wherein the first and second portions of the tool are formed integrally with each other, and comprise a length of wire.

3. The tool of claim 2, wherein the abrasive comprises an abrasive coating disposed on at least the second portion of the wire.

4. The tool of claim 2, wherein the first portion extends along a longitudinal axis oriented substantially parallel to the longitudinal axis of the bore when the tool is inserted into the bore, and wherein the second portion comprises a portion of the length of wire deformed from the longitudinal axis of the first portion.

5. The tool of claim 4, wherein the second portion includes a section tangent to a line parallel to the longitudinal axis of the first portion.

6. The tool of claim 2, wherein the first and second portions diverge from a connector section of the tool which extends along a longitudinal axis coaxial with the longitudinal axis of the bore.

7. The tool of claim 6, wherein the connector section comprises two portions of the length of wire disposed side-by-side.

8. The tool of claim 6, wherein the connector section comprises two portions of the length of wire disposed side-by-side and twisted together.

9. The tool of claim 6, wherein the connector section comprises a trunk section from which the first and second portions diverge, and wherein the first and second portions and the trunk section are integrally formed.

10. The tool of claim 6, wherein the tool is designed to remove burrs from a shoulder, and wherein the second portion bears against the bore wall when the tool is inserted into the bore, and wherein the abrasive is provided on the second portion so as to contact the shoulder but not to contact the bore wall during insertion of the tool into the bore.

11. The tool of claim 6, further comprising a sleeve insertable into the bore for protecting the bore wall from contact by the first and second portions during insertion of the tool into the bore.

12. The tool of claim 6, wherein the tool is designed to remove burrs from a shoulder located at opposite surfaces of the workpiece, wherein the bore extends through the workpiece between the opposite surfaces, and wherein the first and second portions of the tool are defined by the wire being formed to an X-shape for placement within the bore, wherein the abrasive is provided on the portions of the X-shaped wire which engage the opposite surfaces of the workpiece.

13. A tool for removing burrs associated with a bore in a workpiece, the bore being defined by a circular internal side wall, comprising:
 a first wire section;
 a second wire section;
 the wire sections being carried by a structure adapted to be rotated about a longitudinal axis;
 wherein the first and second wire sections engage the internal wall of the bore at two radially spaced locations when inserted into the bore, and wherein the first and second wire sections are resiliently interconnected with each other such that each section is urged against the bore side wall by the other wire section; and
 an abrasive provided on at least one of the wire sections for removing burrs from the bore upon rotation of the tool about the longitudinal axis.

14. A method of removing burrs associated with a bore in a workpiece, the bore being defined by a circular internal side wall, comprising the steps of:
 providing a wire section having a transverse dimension less than that of the bore, at least a portion of the wire section having an abrasive surface;
 placing the wire section within the bore such that the abrasive surface of the wire section engages the internal side wall of the bore at a location within the bore where burrs are to be removed;
 biasing the wire section against the internal side wall of the bore at the location within the bore where burrs are to be removed; and
 rotating the wire section about a longitudinal axis substantially parallel to the longitudinal axis of the bore, wherein the abrasive surface of the wire section is rotated about the internal surface of the bore to remove burrs.

15. The method of claim 14, wherein the step of biasing the wire section against the internal side wall of the bore comprises providing a second wire section resiliently interconnected with the first wire section, wherein the second wire section engages the internal side wall of the bore at a location radially spaced from the location at which the first-mentioned wire section engages the internal side wall of the bore.

16. The method of claim 15, wherein the steps of providing the first-mentioned and second wire sections comprise providing a single length of wire bent 180° onto itself to define a pair of substantially parallel axial legs, and deforming a portion of each leg outwardly away from the other leg, wherein the deformed portions of each leg comprise the first and second wire sections.

17. The method of claim 15, wherein the steps of providing the first-mentioned and second wire sections comprise providing a single length of wire bent 180° onto itself and twisting together portions of the wire section, and deforming portions of the wire section outwardly away from each other, wherein the deformed portions comprise the first and second wire sections.

* * * * *